United States Patent [19]
Gallenberg

[11] Patent Number: 5,353,988
[45] Date of Patent: Oct. 11, 1994

[54] SUSPENSION ASSEMBLY FOR VEHICLE

[76] Inventor: Ronald J. Gallenberg, W9120 Cherry Rd., Antigo, Wis. 54409

[21] Appl. No.: 113,728

[22] Filed: Aug. 27, 1993

Related U.S. Application Data

[63] Continuation of Ser. No. 624,042, Dec. 7, 1990, abandoned.

[51] Int. Cl.⁵ .................... B60G 17/00; B60G 25/00
[52] U.S. Cl. ..................... 239/164; 239/159; 180/41; 280/6.1; 280/DIG. 1
[58] Field of Search ............... 239/159–170, 239/172; 280/663, 666, 672, 713, 701, DIG. 1, 6.1; 180/41

[56] References Cited

U.S. PATENT DOCUMENTS

2,225,966 12/1940 Beemer .................... 280/666
2,994,396 8/1961 Bidwell .................... 280/663
4,786,075 11/1988 Takahashi .................. 280/701

FOREIGN PATENT DOCUMENTS

2088181 6/1982 United Kingdom ............. 239/159

*Primary Examiner*—Karen B. Merritt
*Attorney, Agent, or Firm*—Dorsey & Whitney

[57] ABSTRACT

A suspension assembly for a vehicle such as a boom sprayer or the like having a first axle member with one end connected with a wheel and its opposite end pivotally connected with the vehicle chassis on the side of the chassis opposite such wheel, a second axle member having one end connected with a wheel and its opposite end pivotally connected with the vehicle chassis on the side of the chassis opposite such wheel and first and second air springs operatively positioned between a portion of the axle members and the chassis to cushion the chassis while traversing irregular and bumpy terrain.

18 Claims, 4 Drawing Sheets

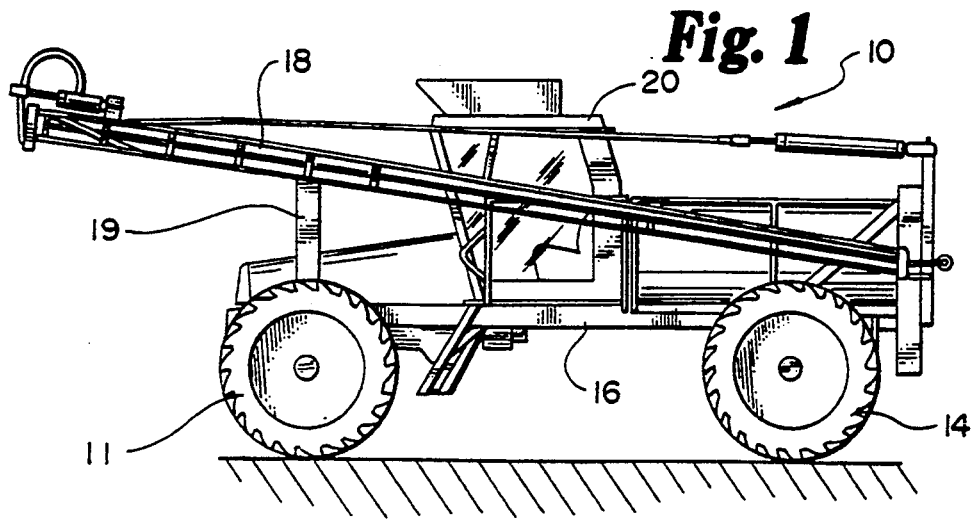
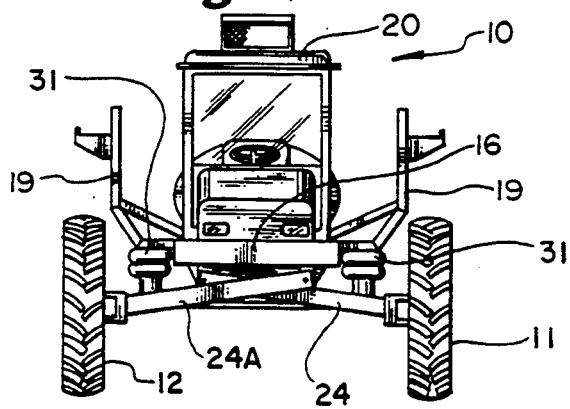
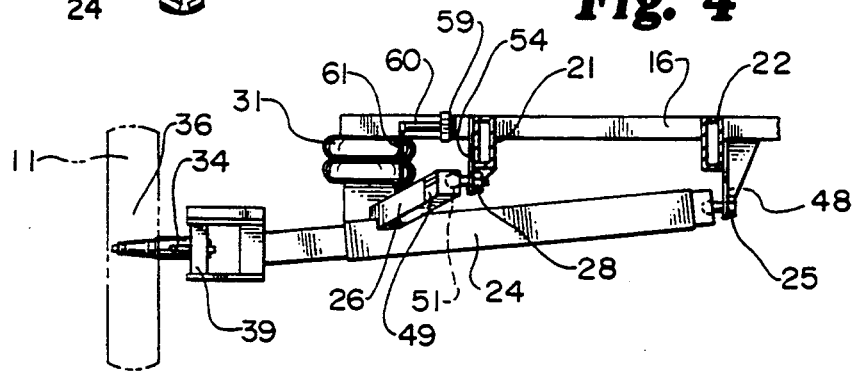
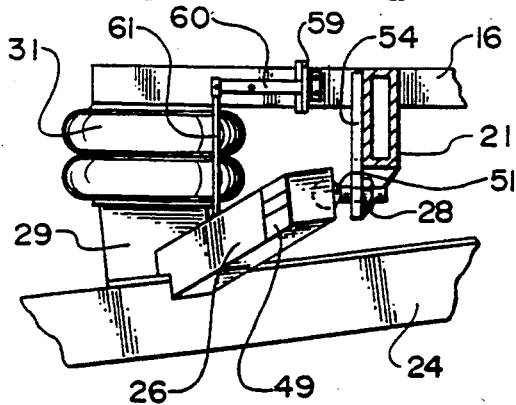

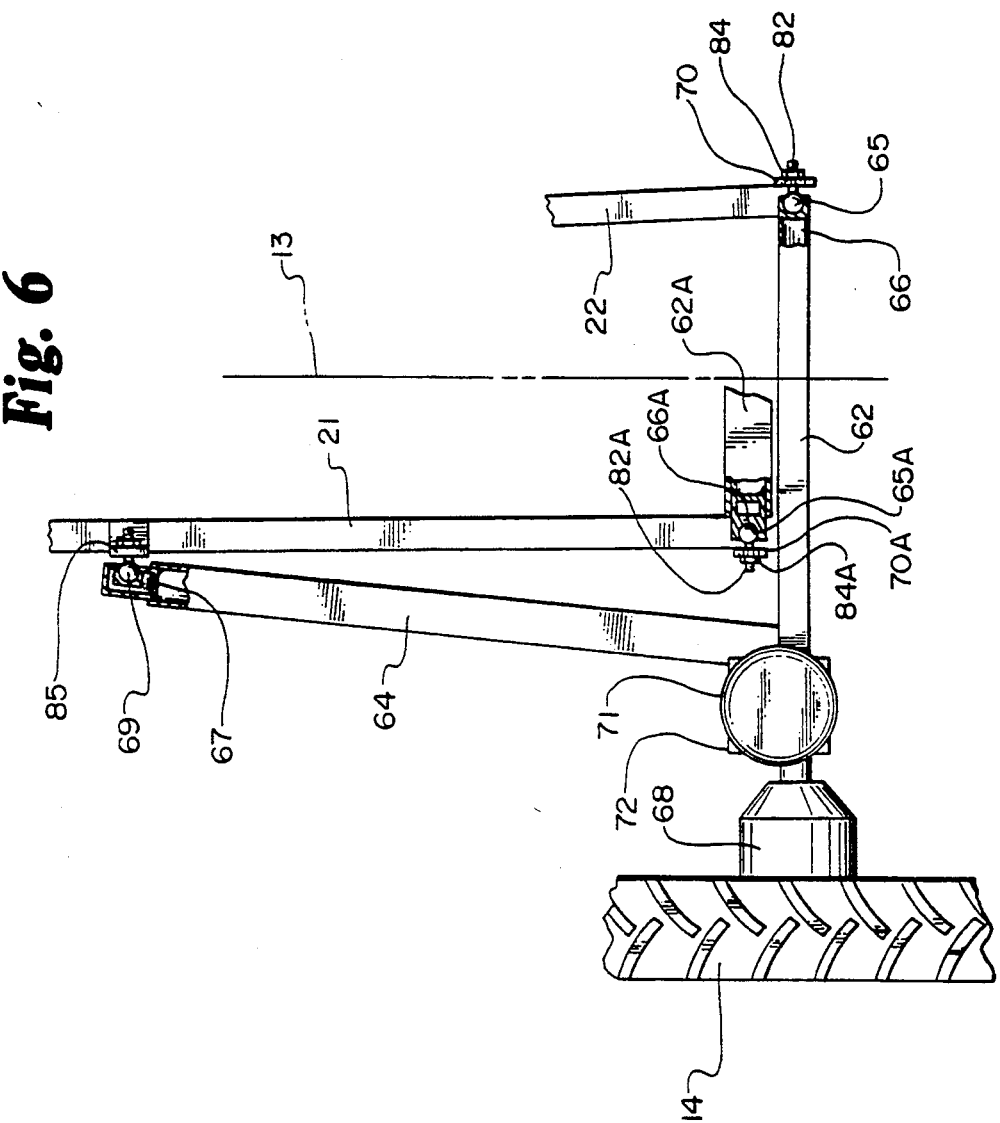

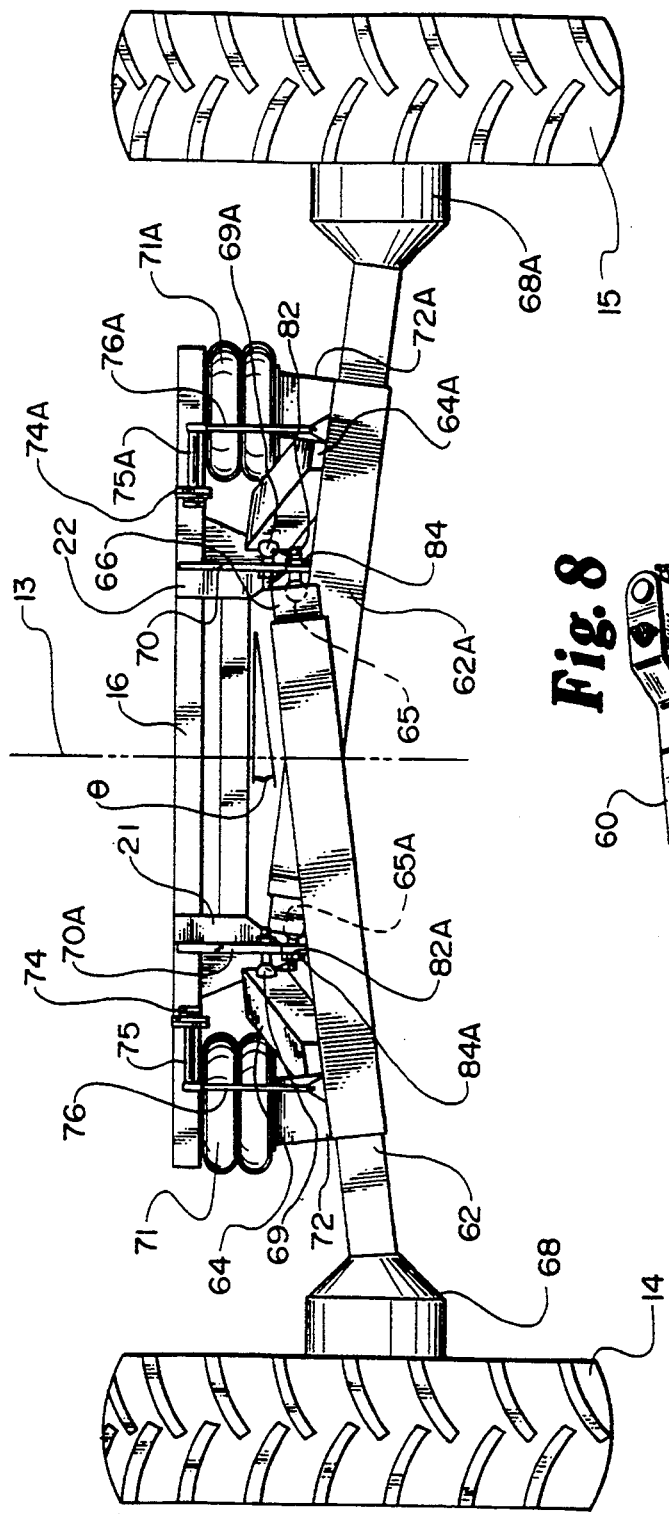

SUSPENSION ASSEMBLY FOR VEHICLE

This is a continuation of application Ser. No. 07/624,042 filed Dec. 7, 1990, now abandoned.

BACKGROUND OF THE INVENTION

1. Field of the Invention

The present invention relates generally to a suspension assembly for a vehicle and more specifically to an improved suspension assembly for a wheeled vehicle such as an agricultural boom sprayer in which a stable platform is particularly desirable.

2. Description of the Prior Art

Various suspension systems for wheeled or other land vehicles currently exist in the art. A typical suspension system includes a pair of shock absorbers and/or other spring means positioned between the vehicle chassis and a generally horizontally disposed axle having a wheel or other terrain engaging means at each end. There are various types of spring means which are utilized in these suspension systems. Commonly used spring means includes heavy coiled springs, air cylinder type springs or air bags which are filled with air or other gas and which function to cushion the vehicle as it traverses the terrain.

It is also common when air bags or other air springs are utilized to employ a metering valve in conjunction with the air springs. Such metering valves detect the position of the axle relative to the vehicle chassis and either inject air into, or release air from, the air bag or air spring, depending upon the specific relative position between the axle and the chassis. Although the above described suspension systems are generally satisfactory for most vehicular applications, unique problems arise for vehicles such as boom sprayers and other vehicles which typically move across irregular terrain surfaces and which requires a stable spray boom supporting platform.

For example, a boom sprayer can embody spray boom sections which extend outwardly from opposite sides of the vehicle as far as fifty feet or more. Because of this structure any tilting movement or other instability of the boom supporting platform is magnified many times at the tip of the boom. Thus, a tilting movement of the supporting platform of a couple of inches can result in corresponding movement at the boom tip of several feet or more. This problem is further compounded by the fact that it is extremely important for a vehicle such as an agricultural type boom sprayer to maintain the boom and the boom tip as stable as possible. Such stability is necessary to prevent damage to the boom and sprayer itself, to allow for more accurate and economical chemical application and to minimize damage to the crops and the environment. These latter factors have become increasingly critical in view of the extremely high environmental standards which must now be adhered to as well as the high cost and the extreme potency of the chemicals or other sprays being delivered.

Some suspension systems have been designed with specific application for boom sprayers. One such system includes a separate parallelogram type linkage for each vehicle wheel with one end connected with the wheel, a second end connected with the vehicle chassis on the wheel side of the center and the immediate portion being cushioned by an airbag or other spring means. Although this structure provides greater stability than ordinary suspensions, additional stability is still needed and desired. Accordingly, there is a need for a suspension system for a boom type sprayer or similar vehicle which is capable of providing a stable boom supporting platform while such vehicle traverses irregular and bumpy terrain.

SUMMARY OF THE INVENTION

In contrast to the prior art, the present invention provides an improved suspension system for a vehicle such as a boom type sprayer or the like and provides an extremely stable platform even while traversing relatively bumpy and irregular terrain.

More specifically, the suspension assembly of the present invention includes a pair of elongated axle members for supporting a corresponding pair of vehicle wheels. Thus, a separate and independent axle member is provided for each wheel of the vehicle. One end of the axle member is connected with the wheel or other terrain engaging means while the other end is pivotally connected to a portion of the vehicle chassis at a point opposite the side on which the wheel is positioned. Thus, a pair of such axle members for a corresponding pair of wheels are positioned relative to one another so that they cross each other at a point intermediate between their ends. Such a structure provides increased effective axle length for each wheel and thus greater stability.

Each of the axle members is cushioned between its ends by a shock-absorbing means. Such shock absorbing means is disposed between a portion of the axle member and the vehicle chassis. In the preferred embodiment, the shock absorbing means includes an air spring in the form of an air bag. Compressed air is introduced into the air bags to absorb the shocks of the wheels caused by sudden dips or rises in the terrain.

The preferred embodiment of the present invention is also provided with levelling means in the form of a metering or levelling valve associated with each of the springs. Such metering or levelling valves currently exist in the art and are commonly used with conventional suspension systems. In the present invention, a control arm of the valve is connected to its respective axle member through a link member to reflect relative movement between the axle member and the chassis. Thus, as the axle moves up or down relative to the vehicle chassis, air is either released from or introduced into the air bag to compensate for the relative movement between the axle and chassis. This functions to maintain the spray booms in a position which is generally parallel to the terrain over which the sprayer is being driven.

Accordingly, it is an object of the present invention to provide an improved suspension system for a vehicle such as a boom sprayer or the like.

Another object of the present invention is to provide an improved suspension system for a vehicle which will provide a stable supporting platform as the vehicle traverses irregular terrain.

Another object of the present invention is to provide a suspension system for a vehicle in which a separate suspension assembly is provided for each wheel and in which the length of the axle members associated with each of the wheels is greater than one-half the distance between corresponding wheels.

A further object of the present invention is to provide a suspension system for a boom sprayer or the like which also includes an air metering means to provide a leveling capability.

A still further object of the present invention is to provide a suspension assembly for a boom sprayer or the like having a combination of an elongated axle member associated with each wheel in combination with an air spring and a metering valve for levelling the support platform.

These and other objects will become apparent with reference to the drawings, the description of the preferred embodiment and the appended claims.

DESCRIPTION OF THE DRAWINGS

FIG. 1 is a side elevational view of a vehicle incorporating a boom type sprayer.

FIG. 2 is a front elevational view of the vehicle of FIG. 1 with the sprayer boom sections removed and showing the suspension assembly for the front wheels.

FIG. 4 is a fragmentary perspective view of the suspension assembly associated with the left front wheel of the vehicle.

FIG. 5 is an enlarged fragmentary perspective view showing the relationship between the axle member, stabilizing bar and levelling valve for the left front wheel of the vehicle.

FIG. 6 is a top elevational fragmentary view of the suspension assembly of the present invention for the left rear wheel of the vehicle, with the vehicle and portions of the chassis removed.

FIG. 7 is a rear elevational view, with parts removed, of the suspension assembly of the present invention for the rear wheels of the vehicle.

FIG. 8 is a perspective view of the metering valve used in the suspension assembly of the present invention.

DESCRIPTION OF THE PREFERRED EMBODIMENT

Figure 3:
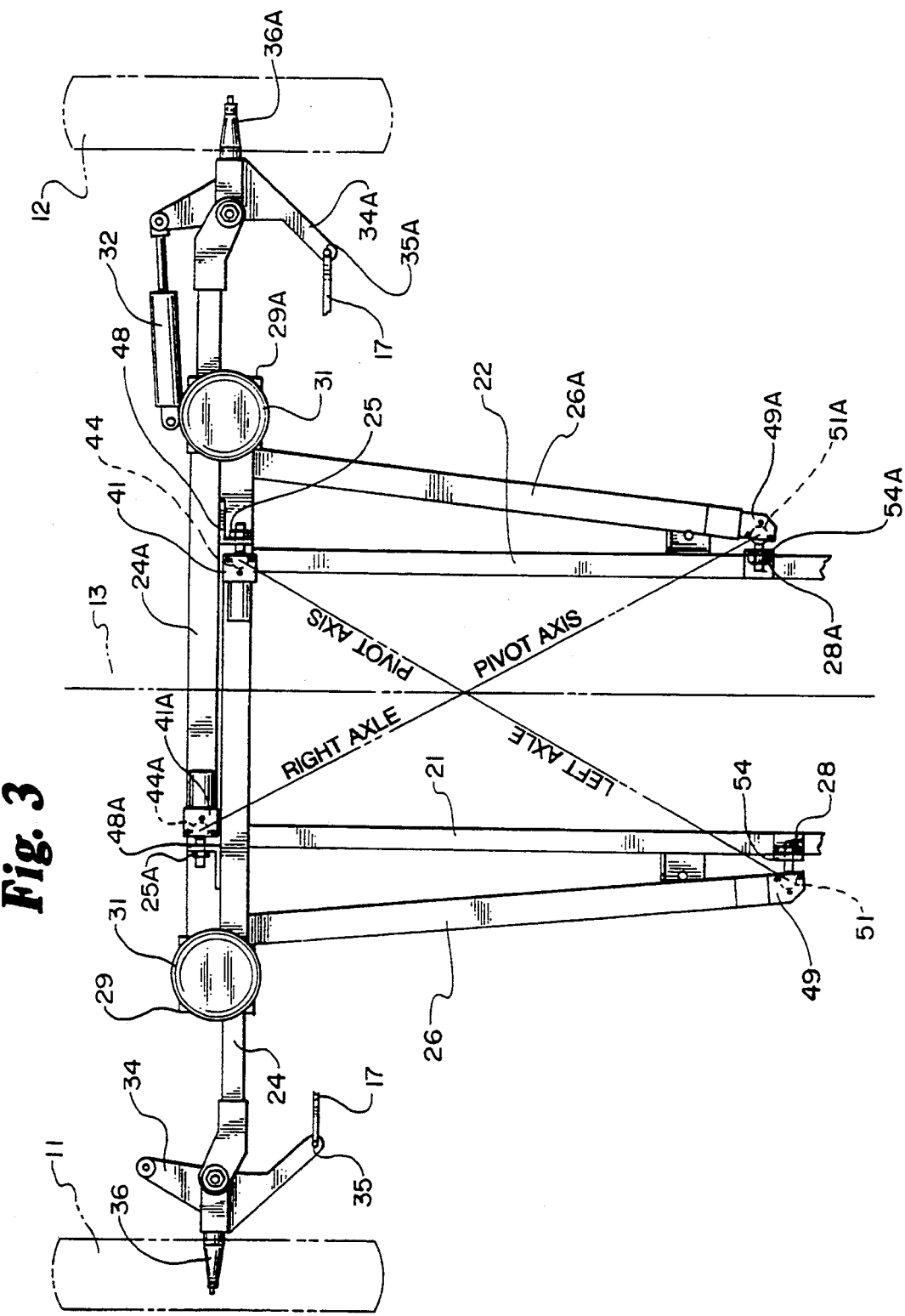
FIG. 3 is a top elevational view of the suspension assembly of the present invention for the front wheels of the vehicle, with the vehicle and portions of the chassis removed.

Reference is first made to FIGS. 1 and 2 illustrating side and front views of a self propelled boom sprayer 10 for which the suspension assembly of the present invention has particular application. The self propelled vehicle 10 includes a main frame or chassis 16, a pair of front, steerable wheels 11 and 12, a pair of rear, driven wheels 14 and 15 and a cab 20. Mounted on each side of the vehicle 10 is an extendable spray boom 18. Each of the extendable spray booms 18 is connected with the rearward end of the vehicle and is movable between a transport position in which the spray booms 18 are positioned along opposite sides of the vehicle 10 as illustrated in FIG. 1 and an operative position in which the spray booms are extended outwardly from opposite sides of the vehicle 10 at approximately right angles relative to the forward movement of the vehicle. When the spray booms 18 are in their transport position as illustrated in FIG. 1, they are supported by a pair of boom support members 19 positioned on opposite sides of the vehicle 10.

In the preferred embodiment of the present invention, the main chassis 16 of the vehicle 10, and thus the support platform for the spray booms 18 is supported by a unique suspension system. Such suspension system includes a suspension assembly associated with the forward end of the vehicle 10 and positioned between the chassis 16 and the forward wheels 11 and 12 and a suspension assembly associated with the rearward end of the vehicle 10 and positioned between the chassis 16 and the rearward wheels 14 and 15. In the preferred embodiment, a separate and independent suspension mechanism is associated with each of the forward and rearward wheels.

The main chassis or frame 16 of the vehicle 10 supports the cab 20, the spray booms 18 and the various other operative components of the vehicle and is in turn supported by the wheels 11, 12, 14, 15 and their respective suspension mechanisms as described below. As illustrated best in FIGS. 3, 4, 6 and 7, the main chassis 16 is provided with a pair of elongated chassis portions 21 and 22 which are a part of the main chassis 16 and extend the entire length of the chassis 16. As will be described in greater detail below, a plurality of mounting brackets 48, 48A, 54, 54A, 70, 70A and 85 (together with a bracket corresponding to 85, not shown) are rigidly secured to the chassis portions 21 and 22. These mounting brackets function to support the various suspension mechanisms for the front 11 and 12 and rear 14 and 15 wheels.

In the preferred embodiment, each of the suspension mechanisms is essentially the same. Thus, only one of the suspension mechanisms for the front wheels 11 and 12 and only one of the mechanisms for the rear wheels 14 and 15 will be described in detail.

The details of the suspension assembly for the forward end of the vehicle 10 are illustrated in FIGS. 3, 4 and 5. Specifically, a separate, independent suspension mechanism is associated with each of the front wheels 11 and 12 to cushion relative movement between the chassis 16 and the wheels 11 and 12 caused by irregularities in the terrain. The suspension mechanism associated with the left front wheel 11 includes an elongated axle member 24 extending transversely across the vehicle 10. Such axle member 24 has one end operatively connected with the left front wheel 11 and the other end pivotally connected with a portion 22 of the vehicle chassis 16. Although a variety of pivotal connections are possible for connecting the axle member 24 with the chassis portion 22, the preferred embodiment of the present invention utilizes a ball and socket connection. Such connection includes a ball member 44 which in the preferred embodiment has a diameter of about 2 5/16 of an inch and which is rigidly secured to a bracket 48. The bracket 48 is rigidly connected with the chassis portion 22 by welding or the like. The ball 44 is connected to the bracket 48 by a threaded portion and a nut 25. The end of the axle member 24 which is pivotally secured to the ball member 44 is provided with a socket mechanism 41 comprised of a pair of members. When bolted or joined together, these members form a cavity to capture the ball member 44 and provide the pivotal connection between the axle member 24 and the chassis portion 22.

It should be noted that the axle member 24 is pivotally connected to the chassis portion 22 on the side of the vehicle opposite from the wheel 11 with which it is associated. Thus, the axle member 24 which supports the left front wheel 11 is pivotally connected to the chassis at a point on the right hand side of the chassis centerline 13 as illustrated best in FIG. 3 and has a length greater than one-half the distance between the front wheels 11 and 12.

As shown best in FIG. 4, the point at which the axle member 24 is pivotally connected to the chassis portion 22 is vertically above the point at which the axle member 24 is connected with the wheel 11. Thus, in a normal rest position as illustrated in FIG. 4, the axle member 24 slopes upwardly from the wheel 11 to the chassis portion 22. Because of this structural relationship, the wheel 11 will move in an arc upwardly and laterally outwardly relative to the chassis 16 as the axle member 24 pivots upwardly relative to the chassis 16 and will move in an arc downwardly and laterally inwardly relative to the chassis 16 as the axle member 24 pivots downwardly relative to the chassis 16.

An elongated stabilizing bar or strut 26 is rigidly secured at one of its ends to the axle member 24 at a point between the ends of the axle member 24. The other end of the strut 26 is pivotally secured to a portion 21 of the chassis 16 by a ball and socket connection mechanism. Specifically, the ball 51 is rigidly secured to a bracket 54 by a threaded member and nut 28. The bracket 54 in turn is rigidly secured to the chassis portion 21 by welding or the like. The end of the strut 26 includes a socket mechanism 49 for capturing the ball 51 for the pivotal connection. As a result of the above described pivotal connections, the axle member 24 is permitted to move vertically upwardly and downwardly about the pivot defined by the ball 44.

The outer end of the axle member 24 is connected to the wheel 11 via a bell crank assembly 34 and a vertical pivot mechanism 39 in a manner known in the art. The bell crank assembly 34 includes an outwardly extending spindle 36 to which the left front wheel 11 is connected and a connection opening 35 to receive a tie bar 17. The tie bar 17 coordinates the steering of the front wheels 11 and 12 in a manner known in the art.

As illustrated best in FIGS. 4 and 5, a shock absorbing or other spring member is provided between the main chassis 16 and an intermediate portion of the axle member 24. In the preferred embodiment this spring member is an air spring in the form of an air bag 31. The air bag 31 is available in the art and is commonly used as an air spring in vehicle suspension systems. In the preferred embodiment, the air bag 31 is positioned between a portion of the main chassis 16 and an air bag support member 29 rigidly secured to a portion of the axle member 24. As illustrated best in FIGS. 3 and 4, the distance between the left front wheel 11 and the air bag 31 is less than the distance between the air bag 31 and the ball 44 by which the axle member 24 is pivotally connected with the chassis portion 22. This extended distance between the air bag 31 and the pivot point of ball 44 provides for a greater axle length and improves the stability of the spray boom support platform.

Also associated with the suspension mechanism for the left front wheel 11 is an air metering valve 59 having a control arm 60 and a linkage member 61 connected between the outer end of the control arm 60 and a portion of the axle member 24. As illustrated best in FIG. 5, the air metering valve 59 is rigidly mounted to the main chassis 16. Thus, relative movement between the axle member 24 and the chassis 16 will result in pivotal movement of the control arm 60 through the linkage 61. This causes air to be released from the air bag 31 or introduced into the air bag 31, depending upon the specific relative position between the axle member 24 and the chassis 16.

The air control metering valve 59 is available in the art and is commonly used in connection with an air spring or air bag in a vehicle suspension system. The metering valve of the preferred embodiment is an air control valve manufactured and sold by Lear Siegler, Inc. under the trademark NEWAY AIR-RIDE. Thus, the details of the metering valve 59 are known. However, a detailed illustration of such valve is illustrated in FIG. 8. As shown, the valve 59 of FIG. 8 includes the control arm 60, a port 57 for receiving compressed air from a compressor or other air source (not shown) mounted on the vehicle, a connection 63 for directing compressed air into the air bag 31 and an exhaust line 67 which functions to exhaust or release air from the air bag 31 when desired.

"During operation, air is introduced into or exhausted from the air bag 31 in response to the relative position between the chassis 16 and the axle member 24. [If the axle member 24 moves toward the chassis 16 as a result (for example) of] When the vehicle [being] is driven across a [on] terrain which slopes to the driver's left, for example, the extended spray booms 18 (FIG. 1) which are connected with the chassis 16 will tend to over rotate or tip. This can cause the outer end of the left boom to be closer to, or drag on, the ground. When this over-rotation occurs, the left side axle (which carries the linkage 61) and the left side of the chassis (which carries the corresponding control arm 60) move toward each other. This causes [has a sloped grade,] the linkage 61 to pivot[s] the control arm 60 upwardly, thus resulting in a switching of the valve 59 to introduce air into the left side air bag 31 [to]. This in turn brings the left side axle member 24 back into the desired [level] position relative to the chassis 16 and thus the desired position of the boom relative to the terrain. If the terrain is such that the axle member 24 moves downwardly relative to, or away from, the chassis 16, the linkage 61 will pivot the control arm 60 downwardly, thus causing the valve 59 to release air from the air bag 31. Such a condition will continue until the relative position between the axle member 24 and the chassis 16 is at the desired and preselected level condition. With the leveling valve 59, the chassis 16 will be maintained in a relatively stable position despite the irregular terrain and at a position in which the booms remain parallel to the slope of the terrain. The air bag leveling mechanism described above, however, does not respond to sudden dips or ridges, which might result from one wheel rolling over a rock or dropping into a hole."

The suspension mechanism for the right front wheel 12 of the vehicle 10 is virtually identical to the suspension mechanism for the left front wheel. Accordingly, it will not be described in detail. Corresponding elements of the mechanism for the right front wheel 12 are given the same reference numerals as the corresponding elements of the left front wheel 11, except that such elements are followed by the letter "A". Such mechanism includes an elongated axle member 24A having its outer end connected with the right front wheel 12 and having its other or inner end pivotally secured to the chassis portion 21 through the bracket member 48A. The pivotal connection between the axle member 24A and the bracket 48A is through a ball and socket joint comprising a ball 44A and a socket member 41A. The ball 44A is secured to the bracket 48A by a threaded member and nut 25A. The stabilizing strut or bar 26A has its forward end rigidly connected with the axle member 24A and its rearward end pivotally secured to the chassis portion 22 through the mounting bracket 54A.

The outer end of the axle member 24A is connected with the right front wheel 12 through a vertical pivot (similar to vertical pivot 39) and a spindle 36A in a manner typical in the art. A bell crank assembly 34A is connected with the wheel 12 in a conventional manner to allow such wheel to be rotated about its pivot. Steering of the vehicle is accomplished by a steering cylinder 32 having one end connected with a portion of the vehicle axle and the other end connected with one arm of the bell crank 34A. A tie bar 17 extends between corresponding portions (35 and 35A) of the bell cranks 34 and 34A so that a steering action provided by the cylinder 32 will turn both front wheels 11 and 12.

As previously described and as illustrated best in FIG. 3, one end of the axle member 24A supports the right front wheel 12 while the other end is pivotally mounted to a portion of the chassis, and specifically the chassis member 21 on the side of the chassis opposite from the wheel 12, i.e., on the left hand side of the chassis centerline 13. This results in the axle members 24 and 24A extending past or crossing one another and so that the inner ends of the members 24 and 24A are mounted to the chassis at a point on the opposite side of the chassis centerline from the wheels with which they are connected. It has been found that this structure, both by itself and in combination with the air spring means and the leveling valves provides an improved suspension system so as to maintain an extremely stable chassis and thus boom supporting platform. As illustrated in FIG. 4, it is also preferable for the axle members 24 and 24A to form an angle of between about 5° and 15° or to slope upwardly from the wheel to the pivot point, relative to the chassis to facilitate greater crop clearance.

The suspension assembly for the rear tires 14 and 15 is virtually identical in structure and operation to the suspension assembly described above for the front tires, and is best illustrated in FIGS. 6 and 7. Specifically, the suspension mechanism associated with the left rear wheel 14 includes an axle member 62 having its outer end connected with the wheel 14 through the hub member 68 and the other or inner end pivotally secured to the chassis member 22 through the mounting bracket 70. This pivotal connection is accomplished via a ball and socket connection comprising the ball 65 and the socket mechanism 66. The ball 65 is rigidly secured to the mounting bracket 70 by a threaded member 82 and nut 84. Similar to the suspension mechanisms described above with respect to the front wheels, the inward end of the axle member 62 is pivotally secured to the chassis member 22 on the side of the chassis opposite from the left rear tire 14, (i.e.), on the right hand side of the chassis centerline 13. Thus, the axle member 62 has a length greater than one-half the distance between the rear wheels 14 and 15.

The axle member 62 is also provided with an air spring means in the form of an air bag 71 which is positioned between a portion of the chassis 16 and a portion of the axle member 62 through an air bag support member 72. An air metering valve 74 is connected with the chassis 16 and includes a control arm 75 and a linkage member 76. The member 76 is connected between the outer end of the control arm 75 and a portion of the axle member 62. The metering valve 74 through the control arm 75 and the linkage 76 detects the relative position between the axle member 62 and the chassis 16 and, depending upon such position, either releases air from the air bag 71 or introduces compressed air into the air bag 71. Thus, the air metering valve 74 and associated structure functions identically to the metering valves 59 and 59A described above with respect to the front wheels 11 and 12.

The axle member 62 is stabilized by a stabilizing bar or strut 64 having its rearward end rigidly secured to the axle member 62 and its other or forward end pivotally secured with the chassis portion 21 through the mounting bracket 85. The pivotal connection is through a ball 69 and socket 67 connection joint similar to the other ball and socket connections previously described.

The suspension mechanism associated with the right rear wheel 15 is identical to the mechanism described for the left rear wheel 14 except that it is positioned on the opposite side of the vehicle and is illustrated best in FIG. 7. In FIG. 7, elements of the right rear suspension mechanism have been given the same reference numerals as the corresponding left rear suspension mechanism elements except that they have additionally been designated by the letter "A".

Similar to the other suspension mechanisms described above for the front wheels, the inner end of the axle member 62 is pivotally secured to the chassis portion 22 on the side of the vehicle opposite the wheel 14 and the axle member 62A is pivotally secured to the chassis portion 21 on the side of the vehicle opposite the wheel 15. It should also be noted that the distance between the rear tires 14 and 15 and their respective air bags 71 and 71A is less than the distance between the air bags 71 and 71A and the respective pivot points 65 and 65A. Thus, as best illustrated in FIG. 7, the axle members 62 and 62A for the rear wheels cross one another and are supported on opposite sides of the chassis centerline 13. Further, each of the axle members is greater than one-half the distance between the rear wheels 14 and 15. Also, similar to the front suspension assembly, the rear axle members 62 and 62A preferably form an angle of between about 5° and 15° relative to the chassis 16 to provide greater crop clearance.

Also similar to the suspension mechanism associated with the front wheels, and as shown best in FIG. 7, the point at which the rear axle members 62 and 62A are connected to the chassis is vertically above the point at which such members are connected to the wheels 14 and 15. Thus, the wheels 14 and 15 will move in an arc upwardly and laterally outwardly relative to the chassis as their respective axle members 62 and 62A pivot upwardly relative to the chassis and will move in an arc downwardly and laterally inwardly relative to the chassis as their respective axle members 62 and 62A pivot downwardly relative to the chassis.

With the structure of the suspension system of the present invention, the axle members associated with each of the wheels have been lengthened. This not only provides for independent stabilization with respect to each wheel and each side of the chassis, but also results in a greater cushioning or shock absorbing effect from the air bags.

Although the description of the preferred embodiment of the present invention has been quite specific, it is contemplated that various modifications could be made without deviating from the spirit of the present invention. Accordingly, it is intended that the scope of the present invention be dictated by the appended claims, rather than by the description of the preferred embodiment.

I claim:

1. A suspension assembly for a vehicle having a chassis with a longitudinal center and a first chassis portion disposed on a first lateral side of the longitudinal center and a second chassis portion disposed on a second lateral side of the longitudinal center, said suspension assembly comprising:

a first elongated axle member having one end connected with a first terrain engaging means on said first lateral side and the other end pivotally connected with said chassis on said second lateral side at a first point vertically above the point at which said first elongated axle member is connected with said first terrain engaging means whereby said first terrain engaging means moves in an arc laterally outwardly relative to said chassis as said first axle member pivots upwardly relative to said first point and said terrain engaging means moves in an arc laterally inwardly relative to said chassis as said first axle member pivots downwardly relative to said first point;

a second elongated axle member having one end connected with a second terrain engaging means on said second lateral side and the other end of said second axle member being pivotally connected with said chassis on said first lateral side at a second point vertically above the point at which said second elongated axle member is connected with said second terrain engaging means whereby said second terrain engaging means moves in an arc laterally outwardly relative to said chassis as said second axle member pivots upwardly relative to said second point and said terrain engaging means moves in an arc laterally inwardly relative to said chassis as said second axle member pivots downwardly relative to said second point;

first spring means operatively positioned between a portion of said first axle member and said first chassis portion; and second spring means operatively positioned between a portion of said second axle member and said second chassis portion.

2. The suspension assembly of claim 1 wherein said vehicle is a boom sprayer.

3. The suspension assembly of claim 1 wherein the length of said first elongated axle member is greater than one-half the distance between said terrain engaging means.

4. The suspension assembly of claim 1 wherein the length of each of said first and second elongated axle members is greater than one-half the distance between said terrain engaging means.

5. The suspension assembly of claim 1 wherein said vehicle is a wheeled vehicle having a pair of front wheels and a pair of rear wheels and wherein said suspension assembly is associated with the rear wheels of said vehicle.

6. The suspension assembly of claim 5 including a second suspension assembly associated with the front wheels of said vehicle.

7. The suspension assembly of claim 1 wherein said first and second spring means comprises first and second air spring means.

8. The suspension assembly of claim 7 including first and second air metering valves associated with said first and second air spring means, respectively, for maintaining said chassis at a desired orientation relative to the terrain.

9. The suspension assembly of claim 8 wherein said metering valves are responsive to relative movement between each of said first and second axle members and said chassis.

10. The suspension assembly of claim 1 wherein each of said first and second axle members includes an elongated stabilizing strut having one end connected with said axle member and the other end pivotally connected with a portion of said chassis.

11. The suspension assembly of claim 1 wherein each of said first and second axle members is generally straight and slope upwardly from the point of connection to its respective terrain engaging means to the point of connection to its respective lateral side of said chassis at an angle of between about 5° and 15° relative to the terrain.

12. The suspension assembly of claim 1 wherein said first spring means is positioned such that the distance between said first spring means and its respective terrain engaging means is less than the distance between said first spring means and the point at which said first axle member is pivotally connected with said chassis and wherein said second spring means is positioned such that the distance between said second spring means and its respective terrain engaging means is less than the distance between said second spring means and the point at which said second axle member is pivotally connected with said chassis.

13. The suspension assembly of claim 1 wherein said first and second elongated axle members are generally straight, are generally parallel to one another and pivot entirely in generally parallel, vertical planes.

14. The suspension assembly of claim 1 including a pair of corresponding said first and said second axle members, one of said pair positioned for supporting the front of said vehicle and the other of said pair positioned for supporting the rear of said vehicle.

15. The suspension assembly of claim 1 wherein said first and second elongated axle members pivot in generally parallel, vertical planes.

16. The suspension assembly of claim 1 wherein said first and second points are laterally spaced from one another and one of said first and second points is positioned forward of the other.

17. A boom sprayer comprising:

a chassis with a longitudinal center and a first chassis portion disposed on a first lateral side of the longitudinal center and a second chassis portion disposed on a second lateral side of the longitudinal center;

first and second front, steerable wheels;

first and second rear wheels;

an extendable spray boom mounted to said chassis and extending outwardly from said chassis on each side thereof;

a first elongated front axle member having one end connected with said first front wheel on said first lateral side and the other end pivotally connected with said chassis on said second lateral side at a first front point vertically above the point at which said first elongated axle member is connected with said first front wheel;

a second elongated front axle member having one end connected with said second front wheel on said second lateral side and the other end pivotally connected with said chassis on said first lateral side at a second front point vertically above the point at which said second elongated axle member is connected with said second front wheel;

a first elongated rear axle member having one end connected with said first rear wheel on said first lateral side and the other end pivotally connected with said chassis on said second lateral side at a first rear point vertically above the point at which said first elongated axle member is connected with said first rear wheel;

a second elongated rear axle member having one end connected with said second rear wheel on said second lateral side and the other end pivotally connected with said chassis on said first lateral side at a second rear point vertically above the point at which said second elongated axle member is connected with said second rear wheel;

fluid spring means operatively positioned between a portion of each axle member and said chassis; and fluid control means associated with each of said fluid spring means for maintaining said chassis at a desired orientation relative to the terrain.

18. The sprayer of claim 17 including linkage means operatively connected with each of said fluid control means for actuating said fluid control means whereby the actuation of said fluid control means is responsive to the relative movement between said axle members and said chassis.

* * * * *

UNITED STATES PATENT AND TRADEMARK OFFICE
CERTIFICATE OF CORRECTION

PATENT NO. : 5,353,988
DATED : October 11, 1994
INVENTOR(S) : Ronald J. Gallenberg It is certified that error appears in the above-indentified patent and that said Letters Patent is hereby corrected as shown below:

In column 6, lines 13-14, delete "[If the axle member 24 moves toward the chassis 16 as a result (for example of)]".

In column 6, line 14, delete "[being]".

In column 6, line 15, delete "[on]".

In column 6, line 23, delete "[has a sloped grade]".

In column 6, line 24, delete "[s]".

In column 6, line 26, delete "[to]".

In column 6, line 27, delete "[level]".

Signed and Sealed this

Seventeenth Day of October, 1995

*Attest:*

BRUCE LEHMAN

*Attesting Officer*   Commissioner of Patents and Trademarks